(12) United States Patent
Beach et al.

(10) Patent No.: US 11,648,737 B2
(45) Date of Patent: *May 16, 2023

(54) SONOTRODE

(71) Applicant: dB Sonics, Inc., Walled Lake, MI (US)

(72) Inventors: Shawn Beach, Lake Orion, MI (US); Theodore Robert Brown, Birmingham, MI (US); David Diegel, Walled Lake, MI (US)

(73) Assignee: DB SONICS, INC., Walled Lake, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/739,733

(22) Filed: May 9, 2022

(65) Prior Publication Data
US 2022/0266536 A1 Aug. 25, 2022

Related U.S. Application Data

(60) Division of application No. 17/132,960, filed on Dec. 23, 2020, now Pat. No. 11,325,319, which is a
(Continued)

(51) Int. Cl.
*B29C 65/08* (2006.01)
*B23K 20/10* (2006.01)
(Continued)

(52) U.S. Cl.
CPC .............. *B29C 65/08* (2013.01); *B22F 10/28* (2021.01); *B23K 20/10* (2013.01); *B29C 65/088* (2013.01);
(Continued)

(58) Field of Classification Search
CPC .... B29C 65/08; B29C 65/088; B29C 66/8181
(Continued)

(56) References Cited

U.S. PATENT DOCUMENTS

| 3,780,926 A | 12/1973 | Davis |
| 8,672,211 B2 | 3/2014 | Cai et al. |

(Continued)

FOREIGN PATENT DOCUMENTS

| DE | 10250741 A1 | 5/2004 |
| DE | 102008029769 A1 | 12/2009 |

(Continued)

OTHER PUBLICATIONS

International Search Report and Written Opinion for International Application No. PCT/US2019/039214 dated Nov. 20, 2019.
(Continued)

*Primary Examiner* — James D Sells
(74) *Attorney, Agent, or Firm* — Carlson, Gaskey & Olds, P.C.

(57) ABSTRACT

A sonotrode includes multiple layers of a material melted to one another to form a structure. The structure provides a base that has an attachment feature that is configured to operatively secure to an ultrasonic converter. The structure includes a shaft that extends from the base to a terminal end that provides a working surface that is configured to selectively engage a workpiece. The structure has at least one shaft that includes a first shaft that extends from the base to a first terminal end that provides a first working surface that is configured to selectively engage a workpiece. The first shaft is integrally formed with the base from the multiple layers to provide an unbroken, monolithic construction.

17 Claims, 14 Drawing Sheets

Related U.S. Application Data continuation of application No. PCT/US2019/039214, filed on Jun. 26, 2019.

(60) Provisional application No. 62/690,071, filed on Jun. 26, 2018, provisional application No. 62/702,411, filed on Jul. 24, 2018, provisional application No. 62/702,401, filed on Jul. 24, 2018, provisional application No. 62/702,429, filed on Jul. 24, 2018.

(51) Int. Cl.
*B29C 65/00* (2006.01)
*B22F 10/28* (2021.01)
*B22F 10/38* (2021.01)
*B22F 10/66* (2021.01)

(52) U.S. Cl.
CPC .......... *B29C 66/8181* (2013.01); *B22F 10/38* (2021.01); *B22F 10/66* (2021.01)

(58) Field of Classification Search
USPC ....................................................... 156/580.1
See application file for complete search history.

(56) References Cited

U.S. PATENT DOCUMENTS

| | | | |
|---|---|---|---|
| 11,325,319 | B2 * | 5/2022 | Beach .................... B29C 66/21 |
| 2003/0155403 | A1 | 8/2003 | Haregoppa et al. |
| 2009/0212089 | A1 | 8/2009 | Christopherson, Jr. |
| 2011/0120622 | A1 | 5/2011 | Moeglich |
| 2014/0124563 | A1 | 5/2014 | Obaditch et al. |

FOREIGN PATENT DOCUMENTS

| | | |
|---|---|---|
| GB | 952042 A | 3/1964 |
| GB | 1200305 A | 7/1970 |
| JP | H11129331 A | 5/1999 |
| WO | 2018115619 A1 | 6/2018 |

OTHER PUBLICATIONS

International Preliminary Report on Patentability for International Application No. PCT/US2019/039214 dated Jan. 7, 2021.

\* cited by examiner

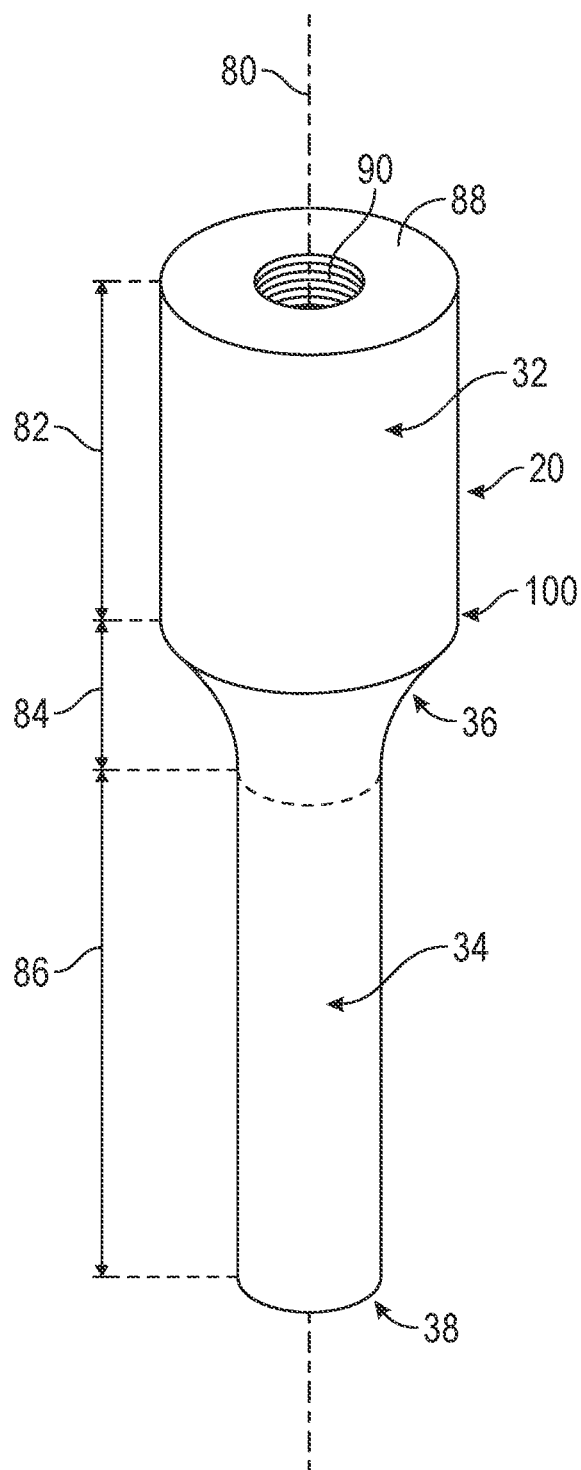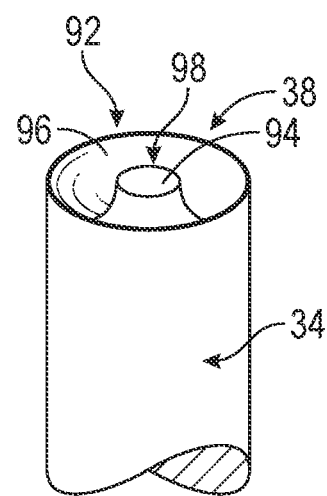
FIG. 3A
FIG. 3B

SONOTRODE

PRIORITY CLAIM

This disclosure is a divisional of U.S. patent application Ser. No. 17/132,960 filed on Dec. 23, 2020, which is a continuation of PCT Application No. PCT/US2019/039214 filed on Jun. 26, 2019, which claims priority to U.S. Provisional Application Ser. No. 62/690,071 filed on Jun. 26, 2018, U.S. Provisional Application Nos. 62/702,411, 62/702,401 and 62/702,429 all filed on Jul. 24, 2018, all of which are incorporated by reference in their entirety.

TECHNICAL FIELD

This disclosure relates to a sonotrode or "horn" for use in ultrasonic welding applications, for example.

BACKGROUND

In a typical ultrasonic welding application, a fixture supports a workpiece to be welded, which may comprise multiple plastic components. An ultrasonic welder typically includes a converter having a piezoelectric stack that selectively vibrates in response to power from a generator. A booster may be used at a working end of the converter to modify the amplitude of the vibrational frequency supplied by the converter. A horn is mounted to the booster opposite the converter and is used to impart vibration to the workpiece.

During a welding operation, the horn is advanced by a pneumatic cylinder to engage the workpiece. The pneumatic cylinder maintains a desired force on the workpiece via the horn. A controller energizes the generator for a time sufficient to weld the components to one another. The horn is retracted once the weld is complete.

Typical horn materials include steel, aluminum and titanium. The horns are constructed from extruded bar stock that is cut to length to provide blanks, which are then CNC lathe machined, for example, to a desired profile that corresponds to a desired design frequency. A computer software suite is often used to design a horn profile that will meet the desired design frequency, which may be between 15 kHz and 40 kHz, but the initial iteration of the machined horn is often not at the desired frequency.

One common plastic welding horn profile includes a narrow cylindrical shaft connected to a cylindrical base by an annular fillet. The base includes a threaded hole that is used to secure the horn to the booster, if one is used, or to the converter. A terminal end of the shaft is polished and includes a shape chosen for the type of welding operation. All external surfaces of the horn are machined by a cutting operation.

The converter, booster and horn are tuned for the overall effectiveness and efficiency in ultrasonic welding. The sonotrode has multiple modes that each have a resonant frequency. For ultrasonic welding, the sonotrode is designed to resonate at a longitudinal mode, which induces a particular displacement at the sonotrode tip used to generate heat and weld the workpiece. Typical machined horns are not repeatable part-to-part such that each horn must be checked to determine if it is at the desired resonant frequency at the longitudinal mode, otherwise a "near neighbor", such as a twisting or a bending mode, may reach resonance. This results in the horn failing to achieve a sufficient displacement in the longitudinal direction, which can compromise the weld or damage the sonotrode over time. Accordingly, it is common to tune each individual horn after machining to ensure resonance at the desired longitudinal mode. Each horn is excited post-machining to determine its vibrational characteristics. The horn's profile is then further machined to increase or decrease its vibrational frequency to match the desired design frequency for the given welding application.

SUMMARY

In one exemplary embodiment, a sonotrode includes multiple layers of a material melted to one another to form a structure. The structure provides a base that has an attachment feature that is configured to operatively secure to an ultrasonic converter. The structure includes a shaft that extends from the base to a terminal end that provides a working surface that is configured to selectively engage a workpiece. The structure has at least one shaft that includes a first shaft that extends from the base to a first terminal end that provides a first working surface that is configured to selectively engage a workpiece. The first shaft is integrally formed with the base from the multiple layers to provide an unbroken, monolithic construction.

In a further embodiment of the above, the structure includes an outer surface that is provided by a substantially unmachined surface.

In a further embodiment of any of the above, the unmachined surface is at least 50% of an area of the outer surface.

In a further embodiment of any of the above, the shaft and base are interconnected by an integral fillet, and the fillet is provided by the unmachined surface.

In a further embodiment of any of the above, the base and the first shaft is constructed of the same material.

In a further embodiment of any of the above, an internal cavity is substantially enclosed by the multiple layers and is arranged interiorly of an exterior surface of the structure.

In a further embodiment of any of the above, a cooling passage is provided within the structure and formed in situ within the multiple layers.

In a further embodiment of any of the above, the cooling passage includes multiple passageways that intersect one another at non-perpendicular junctions.

In a further embodiment of any of the above, the cooling passage is curved and provides an extrados and an intrados at one of the non-perpendicular junctions.

In a further embodiment of any of the above, the structure has a density that varies across at least portions of the multiple layers by greater than 0.1%.

In a further embodiment of any of the above, the attachment feature is one of a stud and a threaded hole. The attachment feature has an unmachined external surface that is formed by the multiple layers.

In a further embodiment of any of the above, the structure extends in a longitudinal direction from the base to the working surface. The attachment feature is provided at a mounting face of the base. The mounting face has a first central point. The working surface has a second central point. The first and second central points are offset relative to one another with respect to the longitudinal direction.

In a further embodiment of any of the above, the structure includes an outer surface, and the structure has a fluid attachment that is provided at the outer surface by the multiple layers. The fluid attachment is in fluid communication with an internal fluid passage.

In a further embodiment of any of the above, the fluid attachment is a barb that is configured to connect to a fluid line.

In a further embodiment of any of the above, the cooling passage includes a venturi that has first and second tapered portions joined at a throat.

In a further embodiment of any of the above, the venturi impinges upon a protrusion at a junction between outlet portions of the cooling passage. The outlet portions are provided in the neck near the terminal end.

In a further embodiment of any of the above, the cooling passage includes an annular passage that is fluidly connected to multiple secondary passages.

BRIEF DESCRIPTION OF THE DRAWINGS

The disclosure can be further understood by reference to the following detailed description when considered in connection with the accompanying drawings wherein:

FIG. 3A is an isometric view of one example sonotrode.

FIG. 3B is an isometric view of an end of the sonotrode shown in FIG. 3A.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. In many instances, like numerals (e.g., 34, 134, 234, etc.) are used to indicate like features.

DETAILED DESCRIPTION

Figure 1:
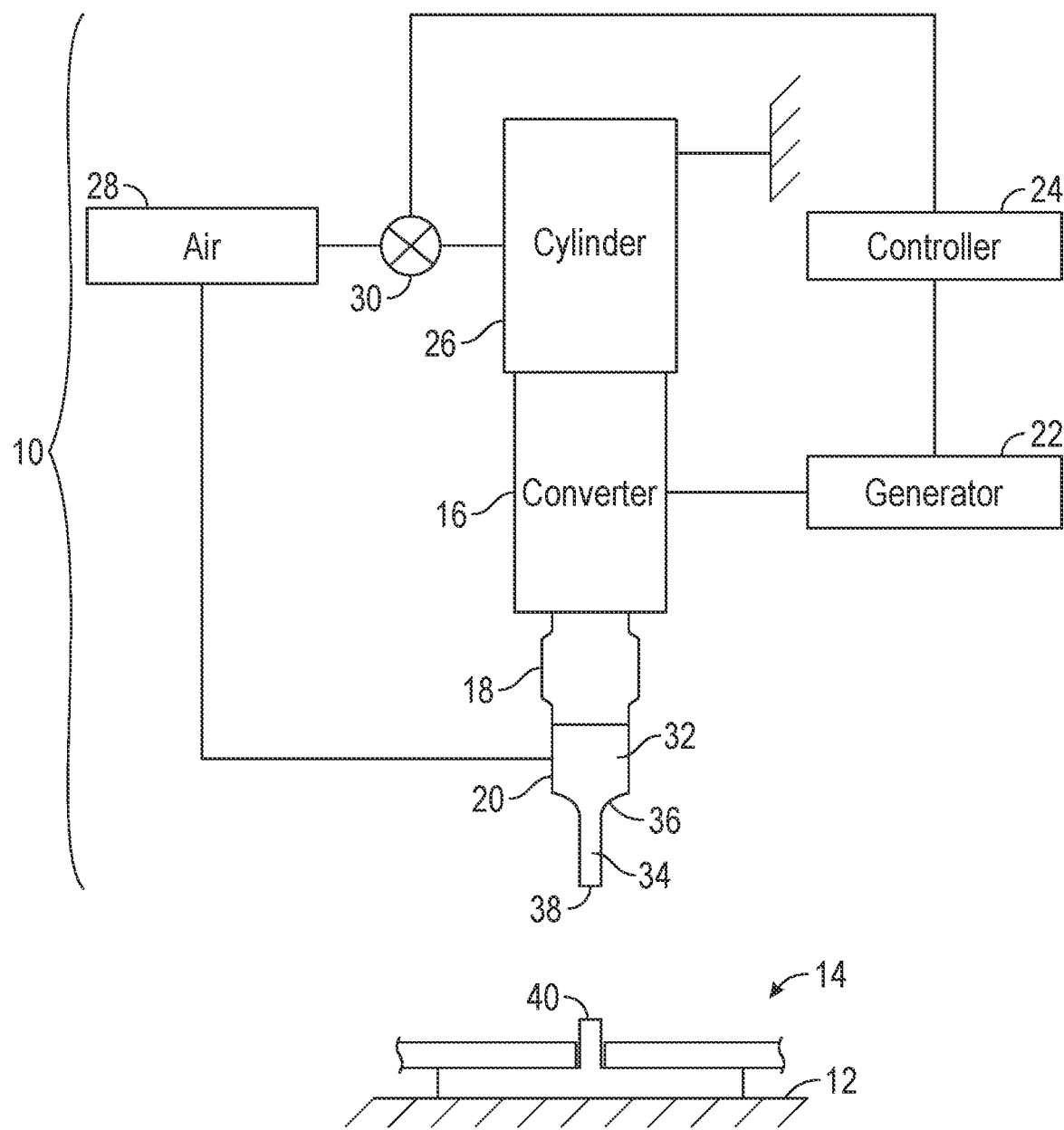
FIG. 1 schematically illustrates a common ultrasonic welder.

An example ultrasonic welder 10 is shown in FIG. 1. The welder 10 is typically used to join multiple components of a workpiece 14 that is supported in a fixture 12. In one example, the workpiece 14 includes plastic automotive components. It should be understood that the ultrasonic welder 10 can be used in other applications, such as packaging and food processing, for example. The disclosed sonotrode can be used with other materials.

A sonotrode 20 selectively engages the workpiece 14 to impart a vibration on the workpiece 14 sufficient to generate heat and melt the components to one another. To this end, the sonotrode 20 is operatively secured to an ultrasonic converter 16, which includes piezoelectric or other elements that vibrate (e.g., at up to 50 kHz) in response to a signal from a generator 22 commanded by a controller 24. The sonotrode 20 may be designed to be used at other frequencies, if desired. A booster 18 may be mounted between the converter 16 and the sonotrode 20 to tune the frequency provided by the converter 16 to the sonotrode 20. The sonotrode 20 has a shaft 34 that extends from a base 32 to a terminal end 38. A fillet 36 provides a transition between the base 32 and the shaft 34.

During operation, a cylinder 26, which may be pneumatic, advances the sonotrode 20 to engage the surface 40 of the workpiece 14 with the terminal end 38 and maintain a contact pressure. Cylinder movement may be regulated by a valve 30 that selectively controls the flow of compress air from an air source 28 to the cylinder 26 in response to a command from the controller 24. The welder 10 can be configured in a different manner than described.

Figure 2:
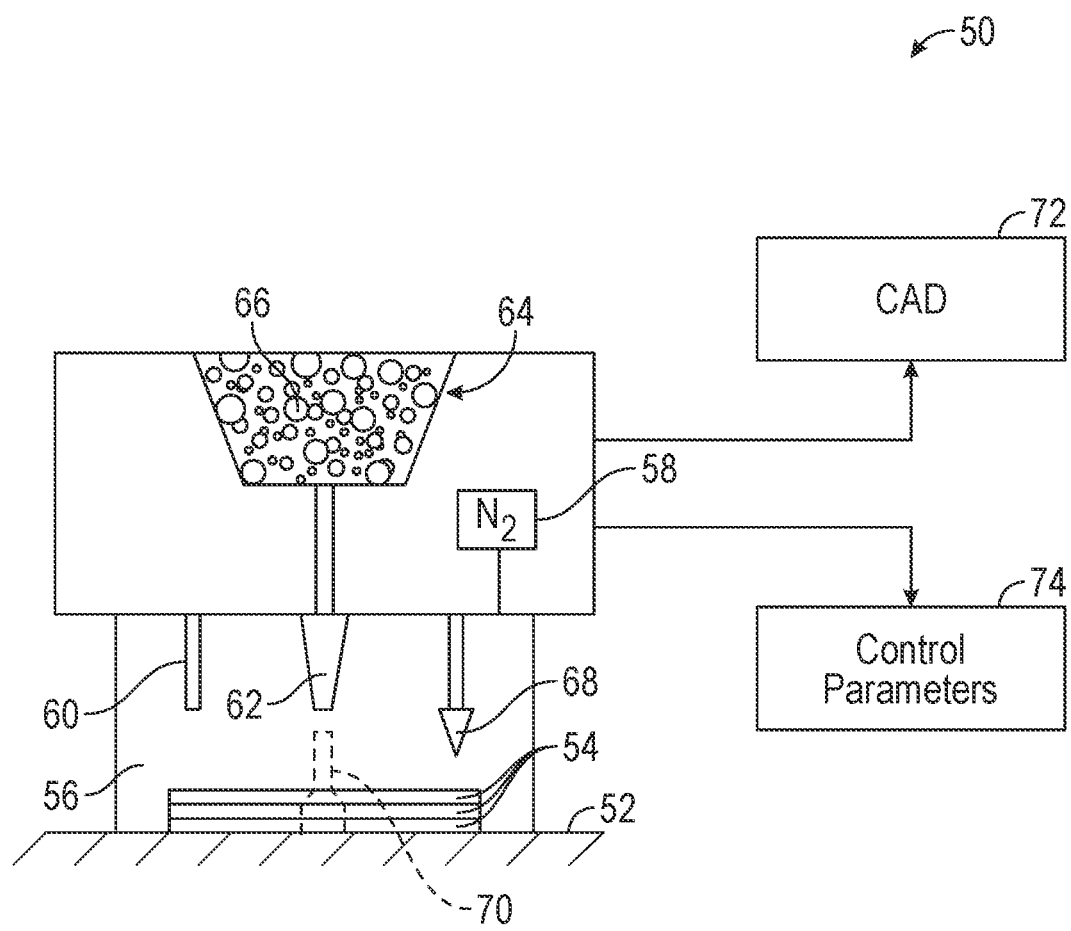
FIG. 2 depicts an example machine used to manufacture the disclosed sonotrode.

The sonotrode 20 is manufactured using a three dimensional printing process, such as direct metal laser sintering (DMLS). One example DMLS machine is an EOS 290. An example DMLS machine 50 is schematically shown in FIG. 2. Multiple layers 54 of a material 66 are deposited onto a plate 52 in an enclosed environment 56 filled with a shielding gas 58. As each layer 54 is laid down by a depositing element 62 onto the prior layer, a scraper or roller 68 levels the deposited layer to a desired layer thickness, for example, 20-60 μm. The scraper 68 does not provide any significant compacting, that is, the material 66 does not "stick" to itself, and is primarily used to level the layer.

A hopper 64 supplies the material 66 to the depositing element 62. The material 66 is at least one of titanium (e.g., Ti 6-4), aluminum and steel, including stainless steel. In one example, the material consists of only one of titanium, aluminum and steel. The material 66 comprises spherically shaped particles of varying sizes, which enables close packing of the particles resulting in maximum density.

The DMLS machine 50 is provided three dimensional CAD data 72 relating to a structure 70 to be manufactured, i.e., the sonotrode 20. The CAD data is parsed into cross-sections that correspond to the layers 54. A computer guided laser 60 sinters the layers 54 together to provide the structure 70 layer-by-layer. In one example, the laser 60 may move at speeds up to 7 m/s. Control parameters 74, such as laser speed and/or intensity, may be varied to achieve desired characteristics of the structure 70, such as density. In one example, the density of the structure 70 is 99.95% of a similarly sized component of the same chemical makeup. In the example, substantially uniform density is maintained in the sonotrode 20 from the base 32 to the terminal end 38.

Figure 4:
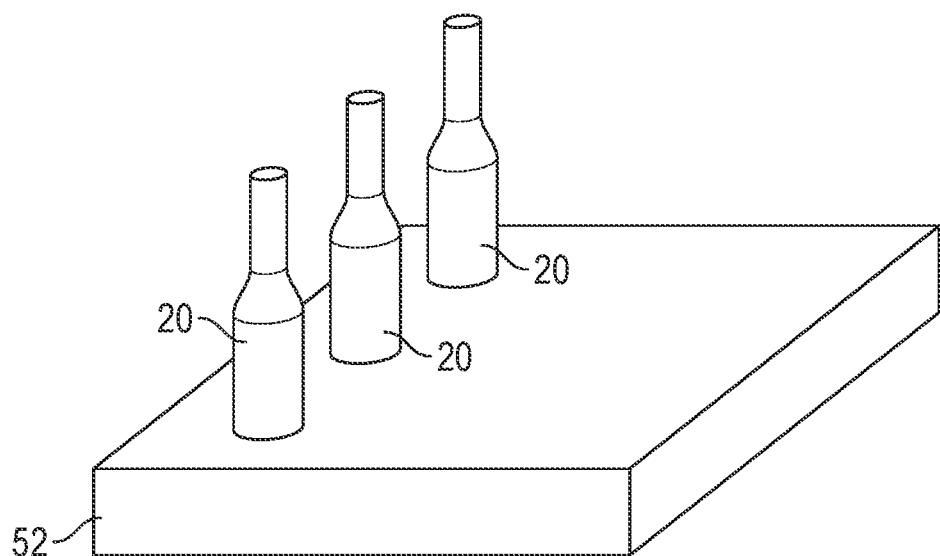
FIG. 4 is a schematic view of multiple sonotrodes printed on a plate.

Multiple parts, i.e., sonotrodes 20, are manufactured on a common plate 52, as shown in FIG. 4. Since the parts are laser welded to the plate 52 during one example printing process, the parts must be removed from the plate, such as by wire electrodischarge machining (EDM).

An example sonotrode 20 produced by a DMLS machine 50 is shown in FIGS. 3A-3B. The sonotrode 20 is constructed on the plate 52 from the base 32 to the terminal end 38 along a longitudinal direction 80, although other build orientations may be used. The base 32, the fillet 36 and the shaft 34 respectively extend in the longitudinal direction 80 first, second and third lengths 82, 84, 86. The base 32 includes a generally planar mounting face 88 that has an attachment feature 90, such as a threaded hole. The attachment feature 90 is used to secure the sonotrode 20 to the converter 16 or the booster 18, for example.

The terminal end 38 provides a working surface 92 that is configured to engage the workpiece 14 during ultrasonic welding. In the example, the working surface 92 is provided by a machined surface 98, which includes geometry adapted for the particular application. One example is a dimple 94, or raised area, that extends from a concavity 96, or recessed area. Such a geometry is suitable for upsetting a plastic component during welding under the pressure of the cylinder 26. The disclosed sonotrode can be used with other materials.

Figure 5A:
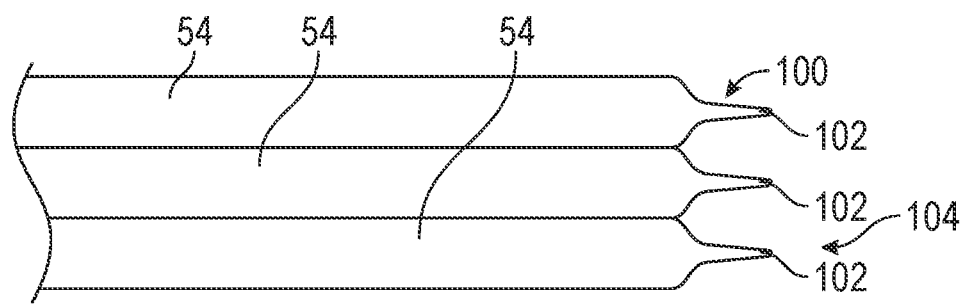
FIG. 5A schematically illustrates raw, laser sintered layers of the sonotrode.
Figure 5B:
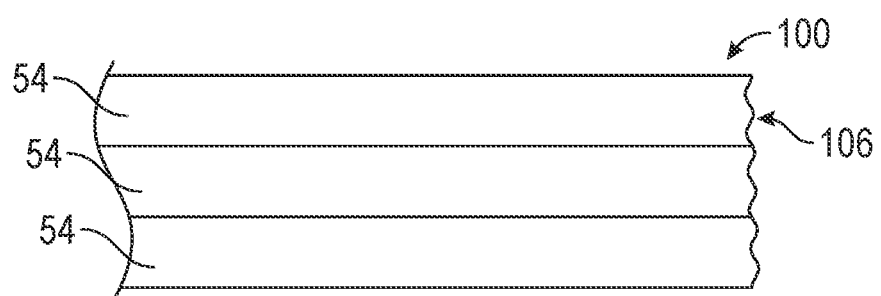
FIG. 5B depicts the sintered layers shown in FIG. 5A after media-blasting.

The sonotrode 20 has an outer surface 100 that is significantly rougher than the machined surface 98. In one example, the machined surface 98 has an average surface roughness of less than 30 Ra, for example, less than 10 Ra. As shown in FIGS. 5A-5B, the outer surface 100 has an unmachined surface 104. The laser sintering process may result in scale 102 or undesired remnants at the periphery of the outer surface 100; the outer periphery circumscribes the longitudinal direction of the shaft 34. Media blasting, such as by using glass beads or other material, can remove this scale 102 providing a smoother media-blasted surface 106. In this disclosure, "machining" does not include media blasting; rather, "machining" is interpreted as cutting with a cutting tool carried by a cutting fixture, such as by a CNC mill or lathe or a grinding machine. Even so, the average surface roughness of the unmachined surface is greater than 150 Ra, for example, 150-450 Ra. In one example, the unmachined surface has an average surface roughness of 325 Ra+/−10% and the machined surface has an average surface roughness of 3.2 Ra+/−50%.

Figure 6:
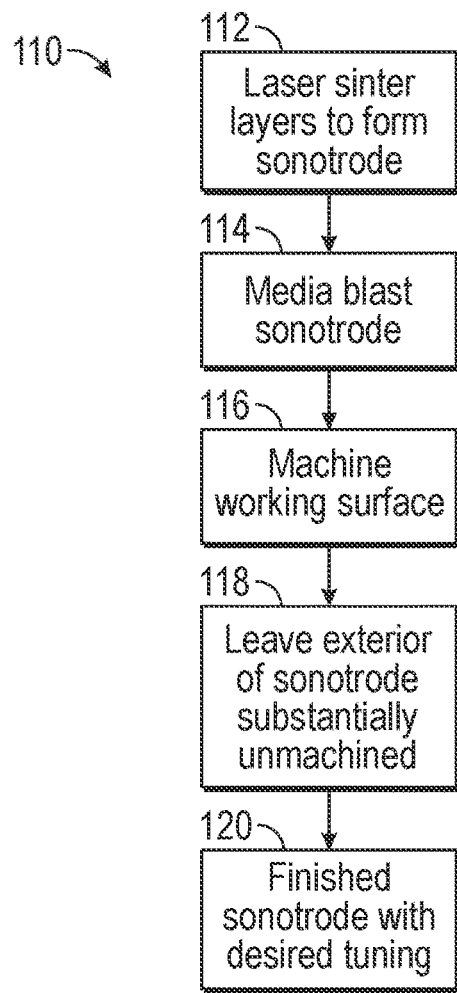
FIG. 6 is a flow chart illustrating an example method of manufacturing the disclosed sonotrode.

A sonotrode manufacturing method 110 is shown in FIG. 6. The method 110 includes the step of laser sintering layers 54 to form the sonotrode 20 according to CAD data 72, as indicated in block 112. The sonotrodes 20 are removed from the plate 52, for example, by wire EDM. The sonotrode 20 may then media blasted to remove undesired remnants, as indicated at block 114, or this step may be omitted. The working surface 92 is machined (block 116) while the majority of the outer surface 100 is left unmachined (block 118) to produce a finished sonotrode having desired tuning characteristics for the welder 10 (block 120).

It is possible that the working surface 92 need not be machined and step 116 omitted if, for example, the layers at the tip are deposited and sintered at a finer resolution, i.e., using thinner layers. That is, some layers may be, for example, 60 μm, and the layers at the tip may be 20-30 μm or less. The finer resolution will result in a smoother surface finish at the working surface 92 providing a suitable Ra for plastic welding.

Unlike prior methods of manufacturing sonotrodes, a substantial area of the outer surface 100 of the sonotrode 20 is provided by an unmachined surface 104. In one example, at least 50% is unmachined, and in another example, at least 75% is unmachined. In still another example sonotrode, at least 90% of the outer surface 100 is unmachined, for example, 95% or more, but less than 100%, for example. The outer surface of the base 32, shaft 34 and fillet 36 is left unmachined, in one embodiment. Machining of the mounting face 88 may also be omitted (i.e., left as an unmachined surface) with precise laser sintering of the layers 54, although a machining process may be used if desired to smooth the surface after cutting the sonotrodes from the plate 52.

According to the disclosed manufacturing method, the sonotrode is laser sintered with the desired tuning characteristics such that the typical machining is not needed. The desired tuning characteristics correspond to transmitting a desired frequency to the workpiece 14 via the working surface 92. The homogeneous properties of the powdered material within a batch and batch-to-batch is quite uniform and the DMLS process is very precise such that harmonics of the end sonotrode are highly repeatable. Sonotrodes of the same part number produced on a common plate and/or plate-to-plate are within 0.75% (e.g., for approximately a 20 kHz converter) of the longitudinal mode resonant frequency of one another and of the desired design frequency for the longitudinal mode so that the individual sonotrodes need not be tuned after manufacturing. In another example, the sonotrodes are repeatable within 0.50% (e.g., for approximately a 35 kHz converter) of one another and the desired frequency, and in another example the sonotrodes are repeatable within 0.25% (e.g., for approximately a 40 kHz converter) of one another and the desired frequency. That is, the sonotrode frequency need not be checked and then machined for being out of frequency, as is commonplace with current sonotrode manufacturing practices in order to avoid resonating at undesired near neighbor modes. Said another way, no more that one machining operation is used at the terminal end to provide the initial surface finish to the working surface, nor is machining needed on unmachined surfaces at other locations on the sonotrode; additional machining of the sonotrode is not required to bring the sonotrode within the desired frequency.

Figure 7:
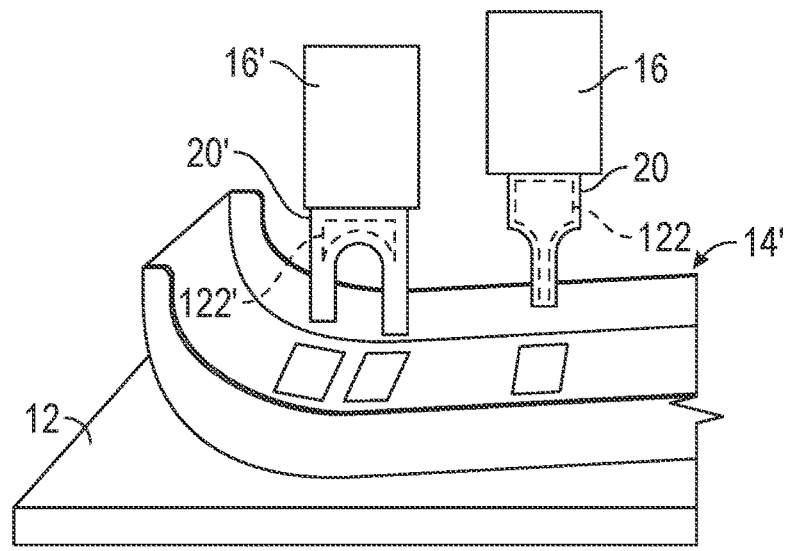
FIG. 7 is a schematic view of an ultrasonic welding machine using at least one disclosed sonotrode to weld a workpiece.
Figure 8:
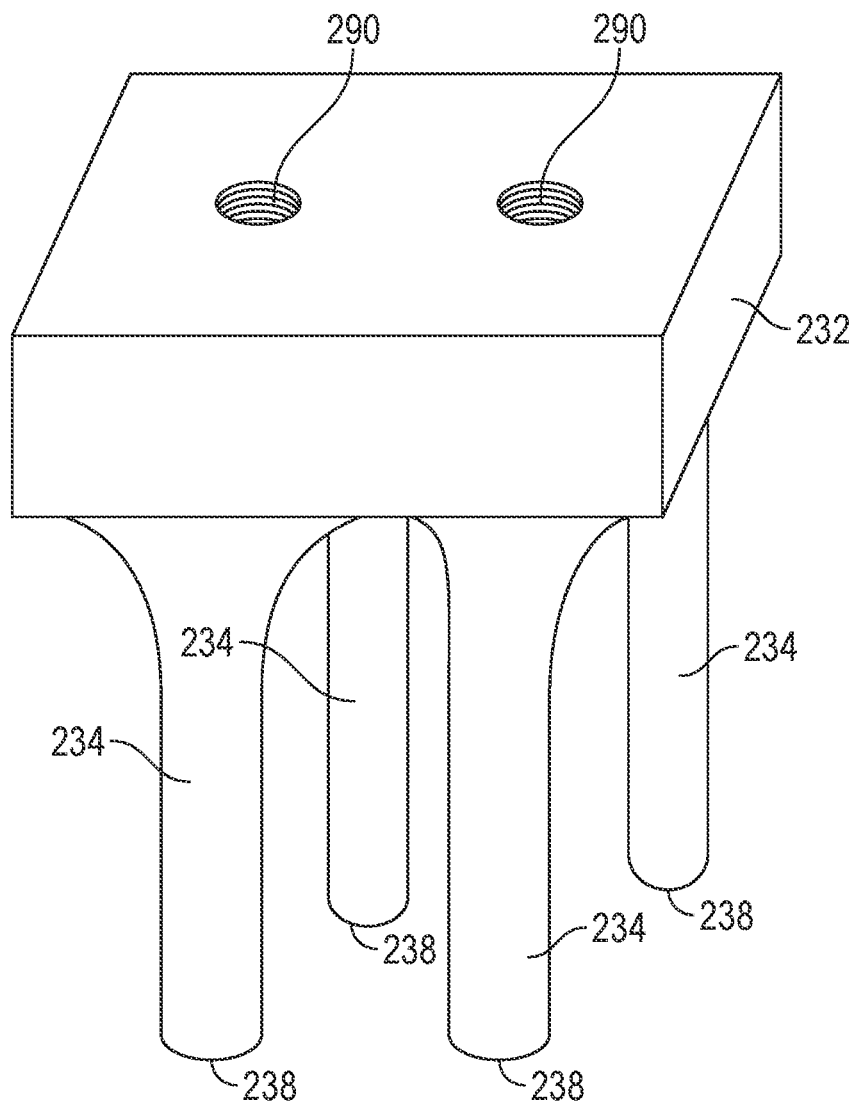
FIG. 8 depicts one example mother-daughter sonotrode.

As shown in FIG. 7, a typical workpiece 14' may include multiple weld points that are welded simultaneously during the manufacturing operation. The workpiece 14' is held in a fixture, and the sonotrodes 20, 20' are respectively operatively mounted to converters 16, 16'. The sonotrodes are advanced and excited to weld the components to one another, as described in connection with FIG. 1. The performance and/or efficiency of the sonotrodes 20, 20' may be improved by incorporating one or more internal cavities 122, 122', which may be used for cooling, lightening or other performance enhancing effects. In one example, the sonotrodes may be lightened such that smaller converters may be used, which may significantly lower the overall cost of the welding system.

As shown in FIG. 7, some sonotrodes 20' have multiple points, referred to as "mother-daughter", such that a single sonotrode may be used to weld multiple weld points. That is, the base 232 includes multiple shafts 234 that each provide a terminal end 238 for welding. More than one attachment feature 290 may be provided on the base 232 depending upon its size. Thus, a first shaft extends from the base to a first terminal end providing a first working surface configured to selectively engage a workpiece, and a second shaft extends from the base to a second terminal end providing a second working surface configured to selectively engage the workpiece. The first and second working surfaces are spaced apart and discrete from one another.

Figure 9:
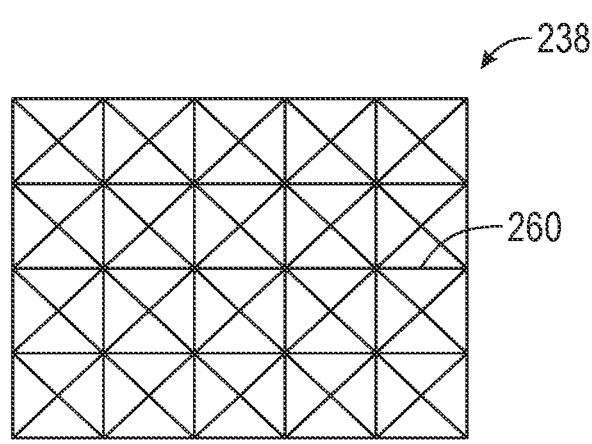
FIG. 9 illustrates a terminal end with a waffle pattern suitable for staking operations.

As shown in FIG. 9, the working surface has multiple raised features providing an increased surface area as compared to a planar working surface bounded by a correspondingly sized and shaped periphery. For example, the working surface of the terminal end 238 may include a waffle or PIP pattern 60, which may be entirely or substantially (e.g., greater than 50%) 3D-printed rather than machined, if desired.

A typical multi-point sonotrode is constructed from shafts that are discrete and separate from the base. The shafts and base are separately manufactured, and then the shafts are secured to the base, for example, by a stud. One common type of multi-point sonotrode manufactures the base from a light weight material, such as aluminum, and the shafts of a more durable material, such as steel or titanium. By way of contrast, the disclosed multi-point sonotrode forms the first and second shafts integrally with the base to provide an unbroken, monolithic construction.

Figure 10:
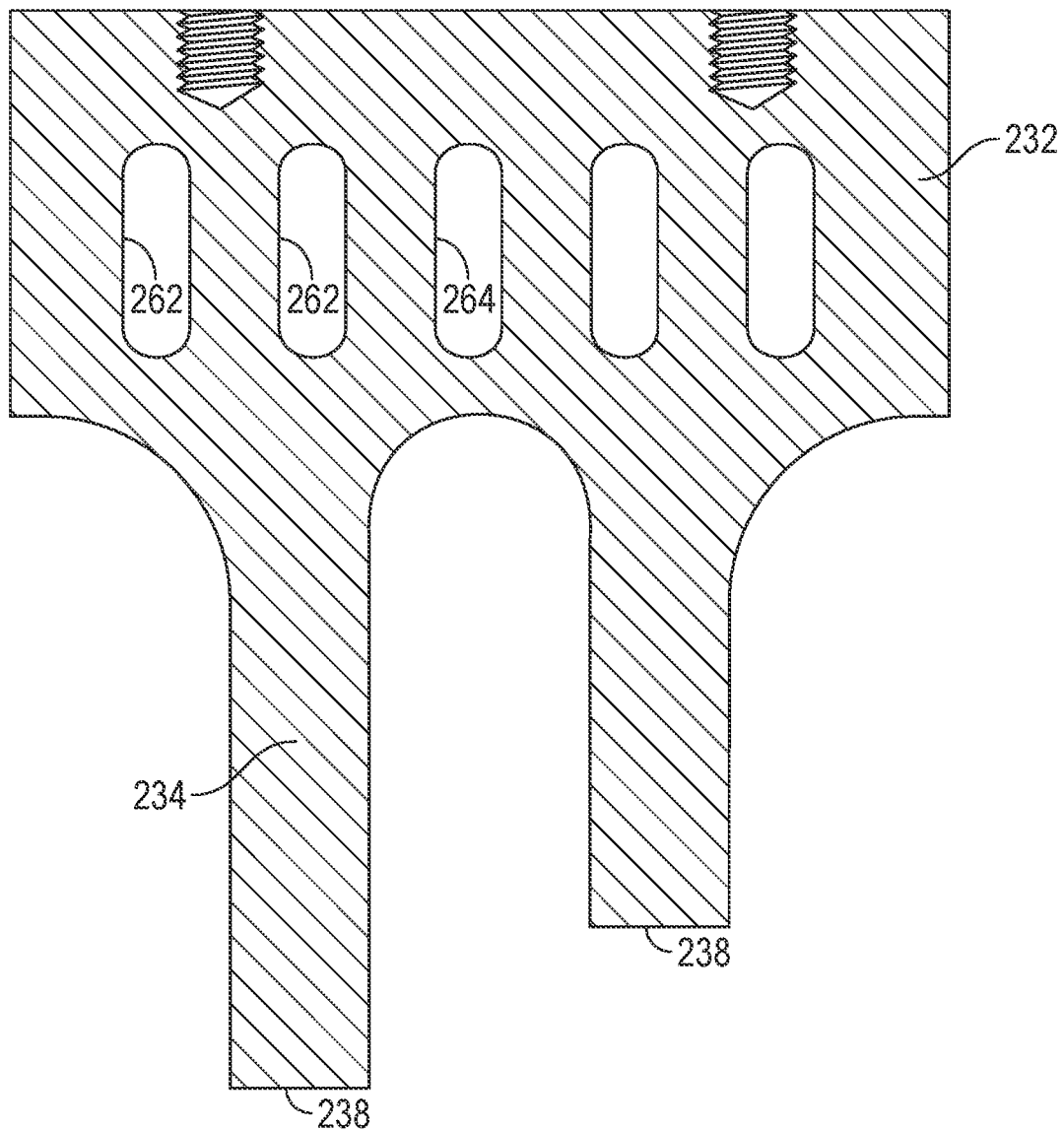
FIG. 10 is a cross-sectional view through a sonotrode, illustrating multiple types of cavities and different length shafts.

In one example, the base 232 and the shafts 234 are constructed of the same material, such as titanium or steel, which are relatively heavy compared to aluminum. The heavy base 232 may be lightened by incorporating one or more substantially enclosed internal cavities 262 or substantially open cavities 264, for example, as shown in FIG. 10, that are provided within the structure and formed in situ within the multiple layers 54 (FIG. 2). The cavity 264 is surrounded substantially entirely by the multiple layers 54 and arranged interiorly of an exterior surface of the structure (e.g., outer surface 100; FIGS. 5A-5B). The substantially enclosed internal cavity (e.g., at least 75%, and in another example, at least 90%) may include at least a small hole sufficient to permit the unsintered powder to escape the cavity subsequent to printing. A fully, 100% enclosed cavity would otherwise retain all of the loose powder. In one example, the base 232 includes at least one opening that extends laterally from one side through to another side (e.g., substantially open cavity 264) in a direction that is at an angle to the longitudinal direction of the shafts 234.

Various portions of the sonotrode may be manufactured to vary the characteristics of the portions. With continuing reference to FIG. 10, at least two of the shafts extend in a longitudinal direction and have lengths that are different than one another. In another example, the base 232 has a first density and at least one of the shafts 234 has a second density that is different than the first density. The density of the shafts may also be varied among one another such that the density of one shaft is greater than the density of another shaft. The greater density may be achieved through porosity differences and/or by varying the thickness of the sintered layers, for example.

The disclosed mother-daughter are provided by a single piece, without separate discrete shafts as is typical in prior art arrangements. There is no complicated set up procedure as the multiple shafts are provided as an integrated inseparable structure with the base. Moreover, a potential failure mode at the prior threaded connection between the mother-daughters is eliminated.

The base can be made lighter than the shafts by incorporating one or more cavities or forming the base in a less dense manner than the shafts during the laser sintering process. The cavities may be internal, external or a combination thereof. This ensures that the base is not too heavy to excite to achieve the desired frequency and amplitude, which enables a smaller, less costly generator.

Figures 11, 11A:
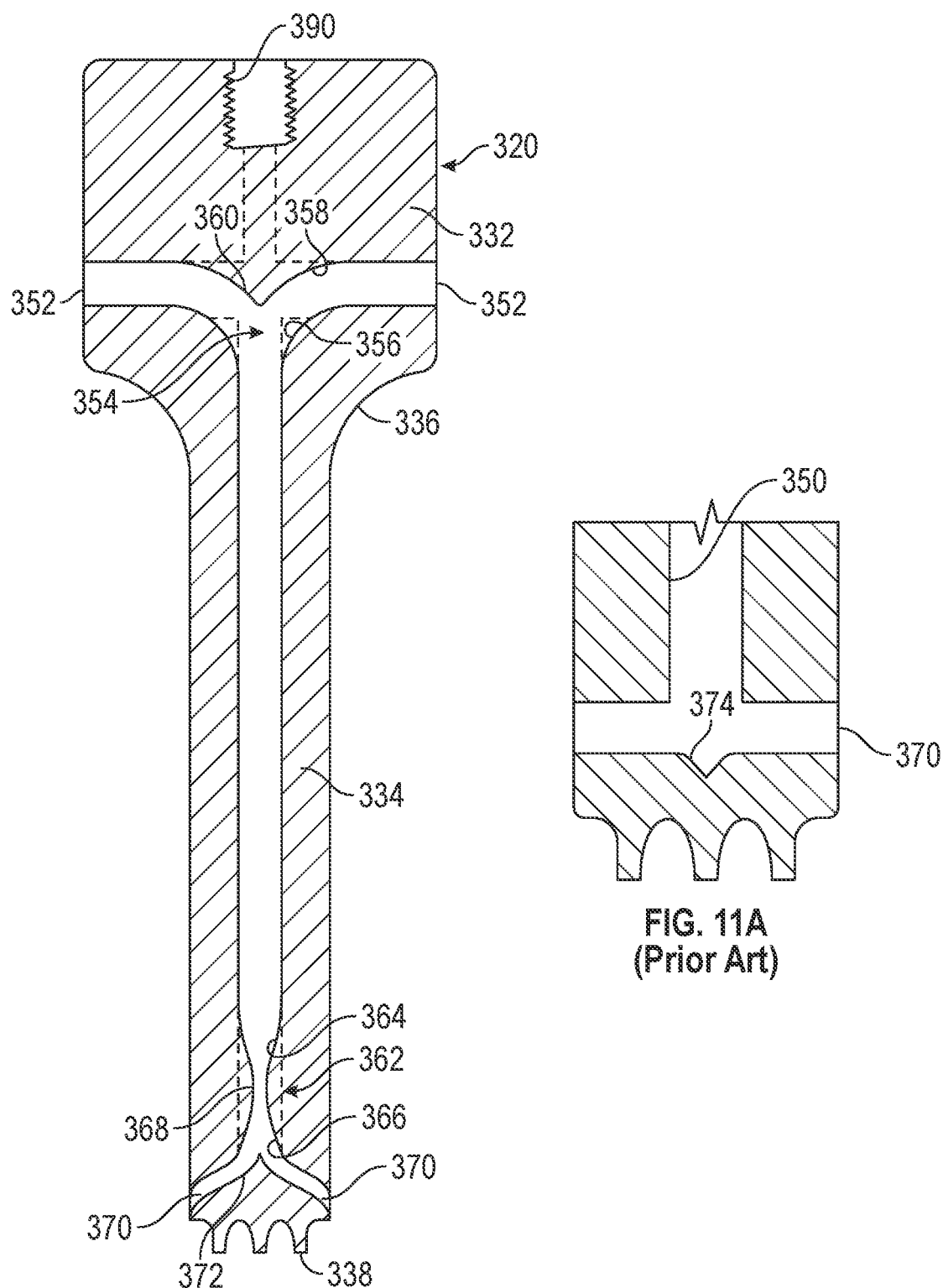
FIG. 11 is a cross-section through one example sonotrode illustrating a fluid flow feature.
FIG. 11A is a partial cross-sectional view of an end of a prior art sonotrode.

Internal cavities may also be used to provide cooling passages that are not possible based upon known sonotrode manufacturing techniques. Referring to FIG. 11, a cooling passage 350 is fluidly connected to the air source 28 (FIG. 1) at one or more inlets 352. A portion of the cooling passage 350 is curved from the inlet 352 to a junction 354 where the cooling passage 350 extends longitudinally within the shaft 334 to one or more outlets 370 at an end of the shaft 334.

The cooling passage 350 includes an intrados 356 and an extrados 358, which extend to the junction 354 in the example. Where multiple portions of the cooling passage 350 extend from multiple inlets 352, a peak 360 may be formed. This smooth transition of intersecting passageways reduces restrictions and associated losses within the cooling passage 350, providing more efficient use and delivery of the cooling fluid.

The cooling passage 350 may include a venturi 362 provided by first and second tapered portions 364, 366 joined at a throat 368. The venturi 362 increases velocity and reduces pressure downstream from the throat 368, which may be beneficial for cooling the terminal end 338. A diffuser provided by a single taper may also be used, if desired.

Figure 12A:
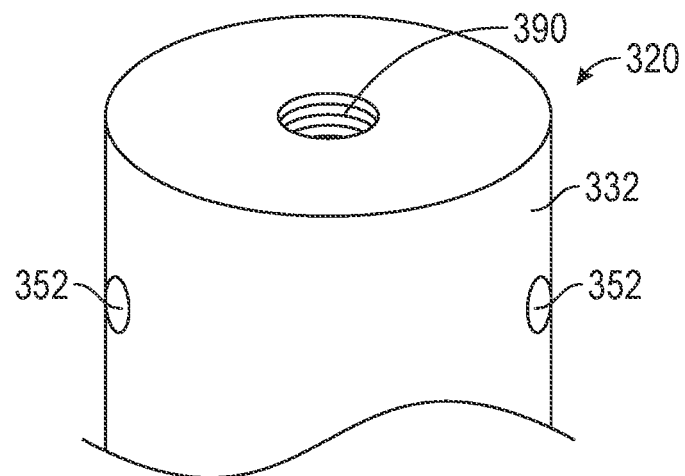
FIG. 12A is a partial perspective view of a base of the sonotrode shown in FIG. 11.
Figure 12B:
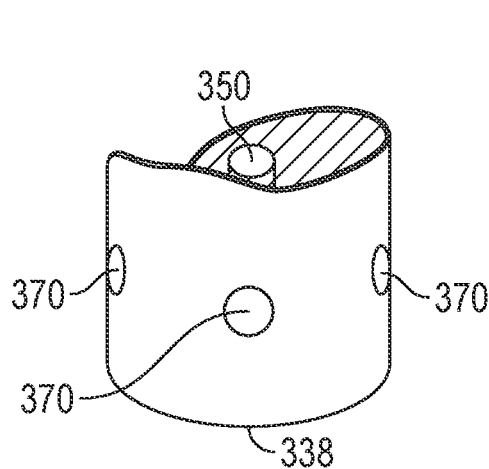
FIG. 12B is a partial perspective view of an end of the sonotrode shown in FIG. 11.
Figure 12C:
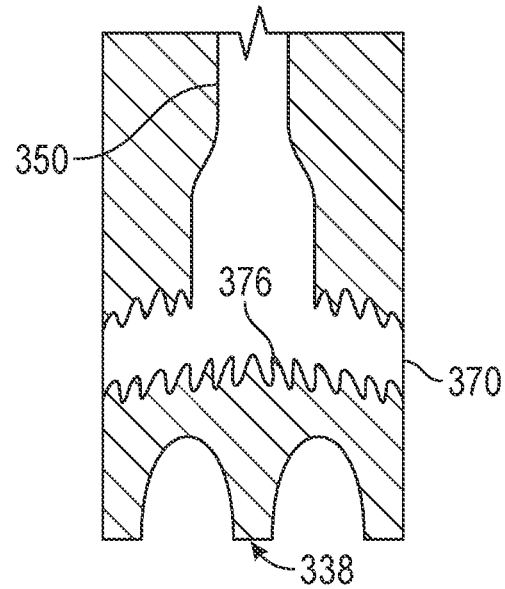
FIG. 12C is an enlarged cross-sectional view of another example sonotrode end.

The portion of the cooling passage 350 extending to the outlet 370 may be at a non-perpendicular angle with respect to the longitudinally extending portion within the shaft 334. A protrusion 372 may be provided where multiple outlet portions are joined to one another. Thus, fluid exiting the venturi 362 may impinge upon the protrusion 372, which provides increased cooling surface and, thus, increased cooling of the terminal end 338. The cooling may further be enhanced by providing one or more roughened or dimpled surfaces 376 to enable heat to dissipate more quickly near the terminal end, as shown in FIG. 12C. These configurations provide smoother fluid flow and reduced losses as compared with intersecting, straight passages as is found in drilled cooling passages of prior art horns (FIG. 11A). Such configurations may, at best, may have a dimple 374 provided as an artifact of drilling the cooling passage 350, which is not repeatable and has minimal effect. Moreover, conventional drilled features may lead to stress risers that result in failure of the sonotrode from repeated cycling.

Figure 13:
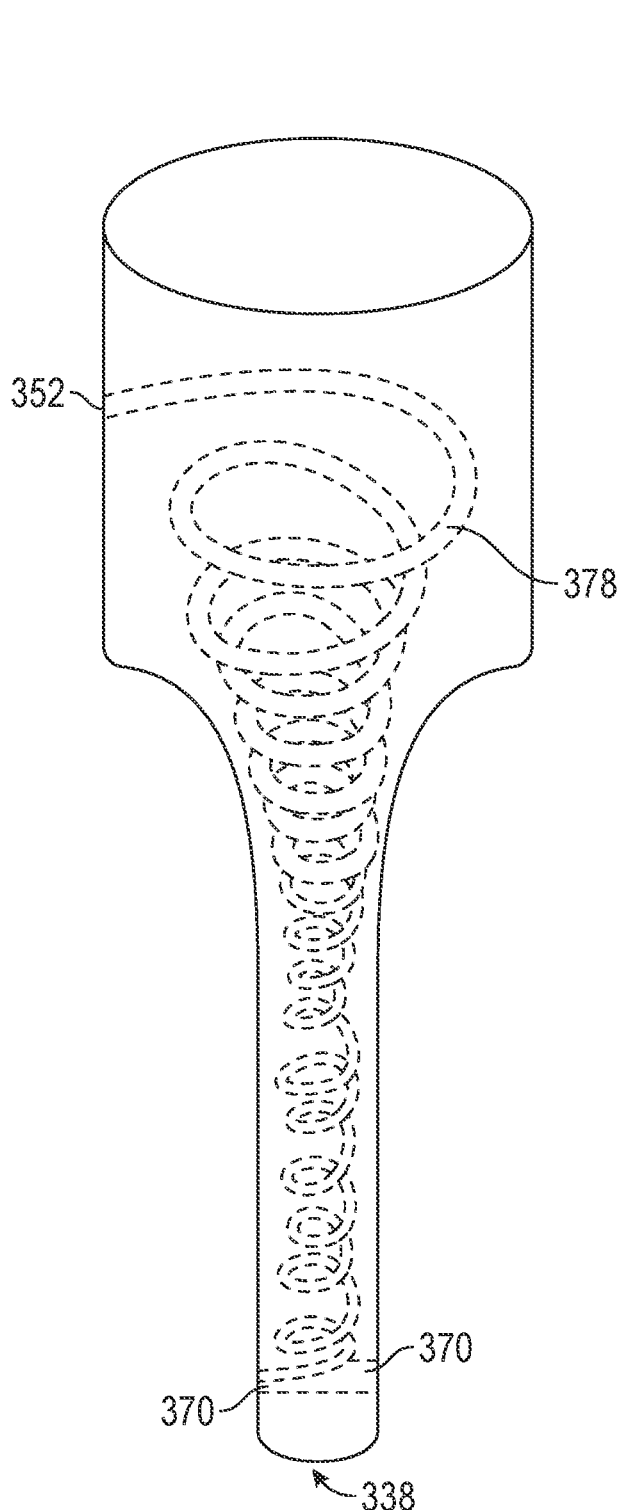
FIG. 13 is an isometric view of another example sonotrode illustrating a corkscrew cooling passage.

Other fluid flow- and cooling-enhancing features may be incorporated into the sonotrode, as shown in FIGS. 13-16. These features, which are much more elaborate than possible with conventional drilling operations, are formed in situ during the laser sintering process of the multiple layers of material. FIG. 13 illustrates a spiral or corkscrew cooling passage 378 which provides increased length and surface area in addition to providing a swirling motion of fluid exiting the outlet 370.

Figure 14A:
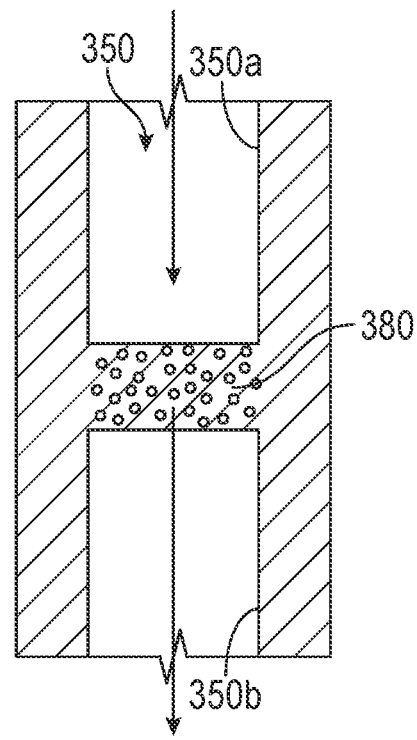
FIG. 14A is a partial cross-sectional view of one example cooling passage restriction.
Figure 14B:
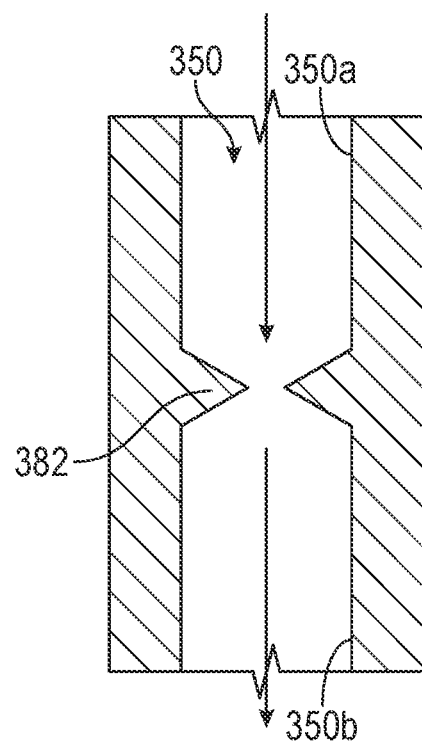
FIG. 14B is a partial cross-sectional view of another example cooling passage restriction.

FIGS. 14A and 14B illustrate restrictions that may create a Joule-Thompson effect. In the example shown in FIG. 14A, a porous plug or blockage 380 is provided in the cooling passage 350, separating the passage into first and second passageways 350A, 350B. In the example shown in FIG. 14B, the restriction is provided by a valve or orifice 382 that throttles the fluid flow. As a result of the restriction, the temperature downstream of the restriction is reduced.

Figure 15:
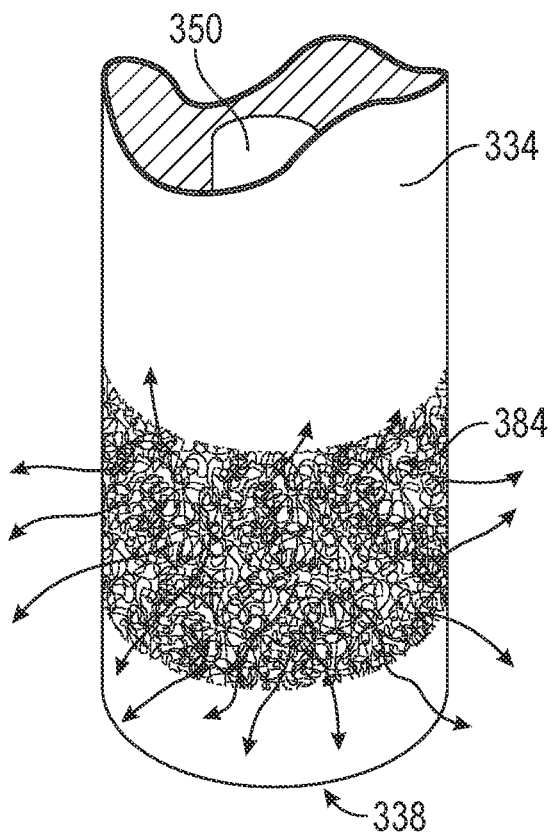
FIG. 15 is a perspective view illustrating a sonotrode end with porosity extending to the external surface to provide a cooling passage outlet.

FIG. 15 illustrates an arrangement in which an end of the shaft 334 near the terminal end 338 incorporates external porosity 384 intentionally created during the 3D laser sintering that extends radially inward to fluidly connect to the cooling passage 350. The porosity is like a "fish filter" and provides diffuse, distributed flow at the outlet of the cooling passage 350. The porosity 384 may extend about the entire circumference of the shaft 334 or just portions of its circumference.

Figure 16:
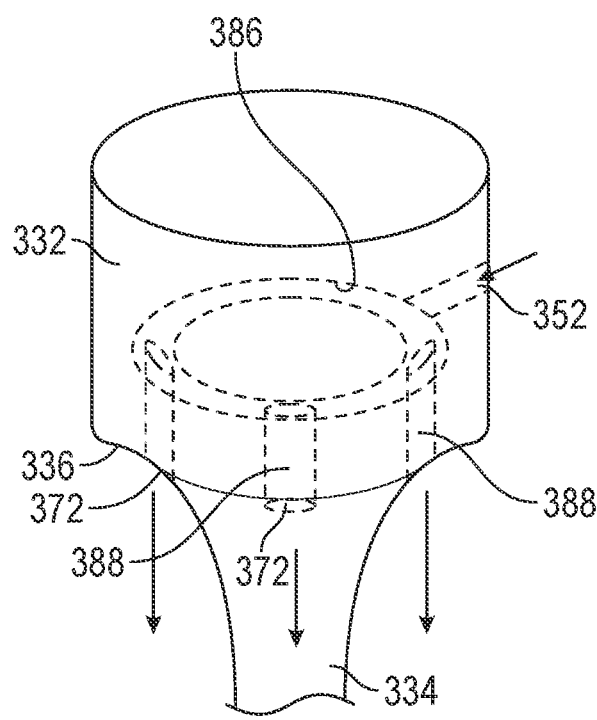
FIG. 16 is a partial perspective view illustrating an annular cooling passage.

Another cooling configuration is shown in FIG. 16. An annular passage 386 is arranged in the base 332, the annular passage 386 received fluid from the inlet 352 and is fluidly connected to multiple secondary passages 388 that deliver cooling fluid to fillet 336, which expels the fluid through the outlet 372 and down the exterior of the shaft 334. The secondary passages may be angled or otherwise shaped to generate a vortex of cooling fluid down the shaft 334.

The above-described cooling features can provide improved cooling of the sonotrode, which increases duty cycle, improves weld quality thereby eliminating the need for external vortex coolers that are sometimes used on high duty cycle applications.

Figure 17A:
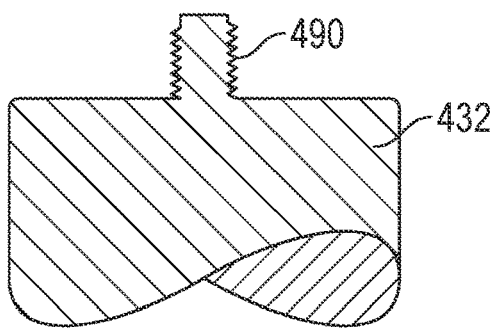
FIGS. 17A and 17B depict example attachment features for a sonotrode.
Figure 17B:
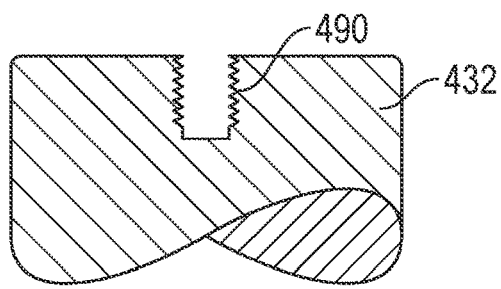

Referring to FIGS. 17A and 17B, the attachment feature 490 arranged at the mounting face 432 is provided by an unmachined external surface formed by the multiple layers. That is, the attachment features 490 are not machined by a cutting tool, but rather formed during the DMLS process. In the examples, the attachment feature 490 is one of a stud (FIG. 17A) and a threaded hole (FIG. 17B).

Figure 18:
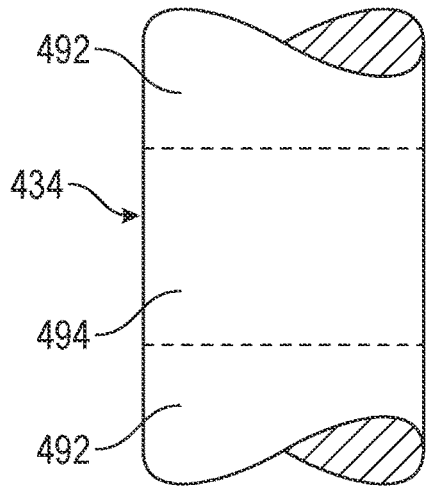
FIG. 18 illustrates a denser region containing a nodal point to provide strengthening.
Figure 18:
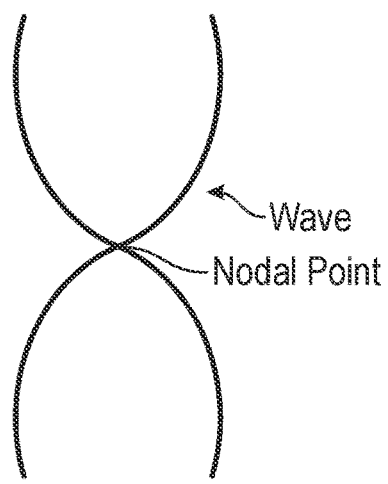

As described, the density within the sonotrode may be varied. In one example, it may be desirable to vary the density across at least portions of the multiple layers by greater than 0.1%, for example. The ultrasonic converter 16 (FIG. 1) is configured to induce a vibratory frequency in the structure that produces a wave form having at least one nodal point, as schematically illustrated in FIG. 18. The nodal points in the shaft 434 experience greater stresses. In one example, the wave form is configured to flow in a direction that runs primarily through the multiple layers, although other layer orientations may be employed. The structure has a greater density in a region 494 of the structure with the nodal point than in adjacent regions 492, which provides increased strength at the nodal point.

Increased strength may also be provided at the tip of the sonotrode. In one example, it is desirable to have a greater density and/or less porosity or voids at the terminal end and the working surface as compared to adjacent structure in the shaft. For example, a first portion of the structure extending from the working surface to 10% of the length has a first density, and the adjacent structure has a second density that is less than the first density.

Figure 19:
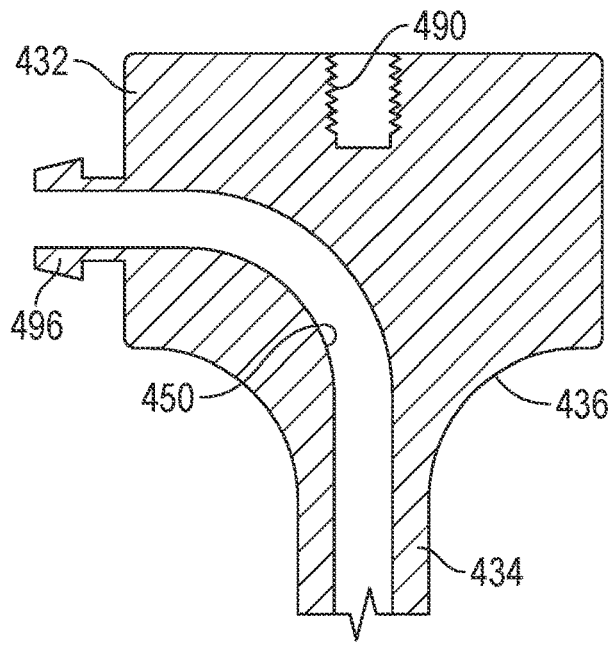
FIG. 19 shows an integrated fluid attachment.

Referring to FIG. 19, the sonotrode, for example, the base 432, has a fluid attachment 496 provided at the outer surface by the multiple layers, i.e., integral with the sonotrode and without machining. The fluid attachment 496, which may be near the fillet 436, is in fluid communication with an internal fluid passage 450. In the example, the fluid attachment 496 is a barb configured to connect to a fluid line to the air source 28 (FIG. 1).

Figure 20:
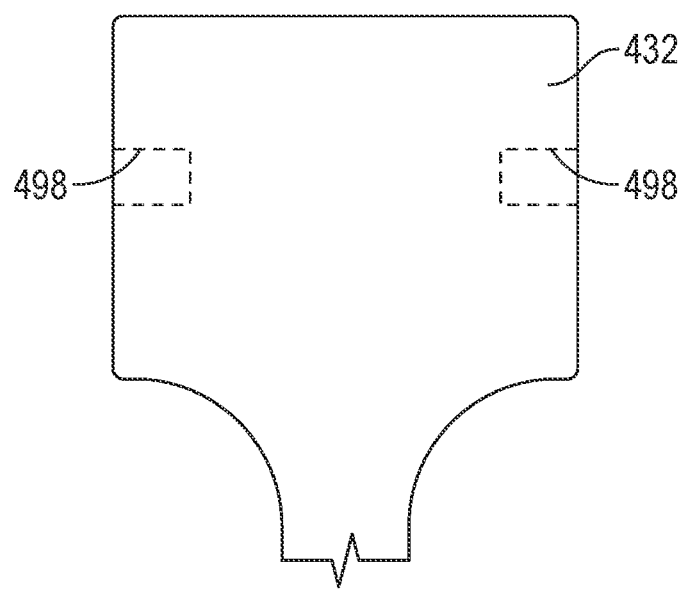
FIG. 20 illustrates circumferentially spaced holes formed during the laser sintering process and configured to receive a tool for installation of the sonotrode.

The base 432 may include circumferentially spaced holes 498 each provided by an unmachined external surface formed by the multiple layers, i.e., integral with the sonotrode and without machining, as shown in FIG. 20. An installation tool cooperates with the holes 498 to torque the sonotrode relative to the converter 16 (FIG. 1).

Figure 21:
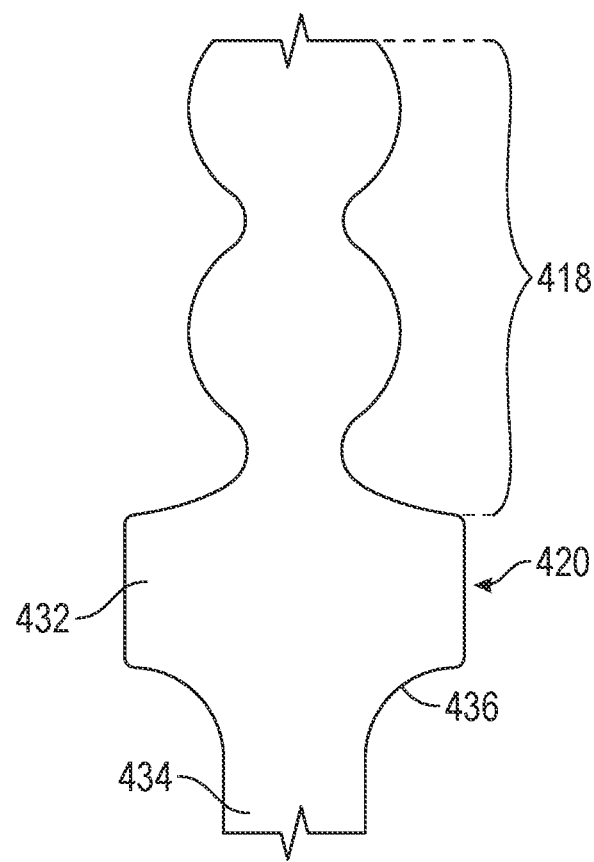
FIG. 21 depicts a unitary booster and sonotrode that are produced together in the same laser sintering process.

Referring to FIG. 21, the attachment feature is not provided by a stud or threaded hole, but is instead an integral transition to a booster 418 configured to attenuate a frequency from the ultrasonic converter 16 (FIG. 1). In the example, the booster 418, the base 432 and the shaft 434 provide a monolithic, unitary structure.

Figure 22:
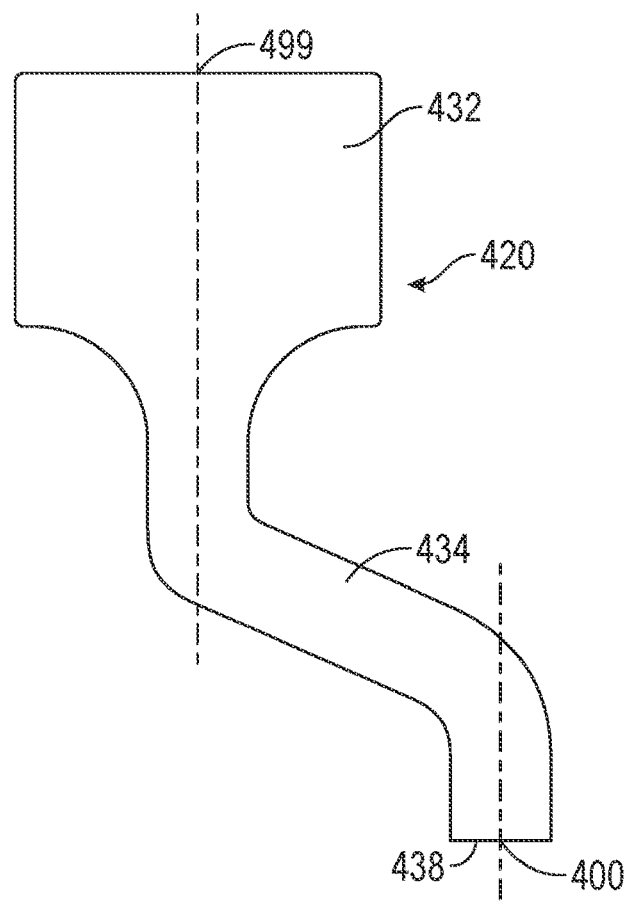
FIG. 22 illustrates a sonotrode with a terminal end offset from the base.

As shown in FIG. 22, the sonotrode extends in a longitudinal direction from the base 432 to the working surface of the terminal end 438. The longitudinal direction is perpendicular to at least one of the mounting face and the working surface. The mounting face has a first central point 499, and the working surface has a second central point 400, such that the first and second central points 499, 400 are offset relative to one another with respect to the longitudinal direction. In this manner, the working surface may be positioned in difficult to reach work areas that would not be feasible using traditional sonotrode manufacturing methods.

Figure 23:
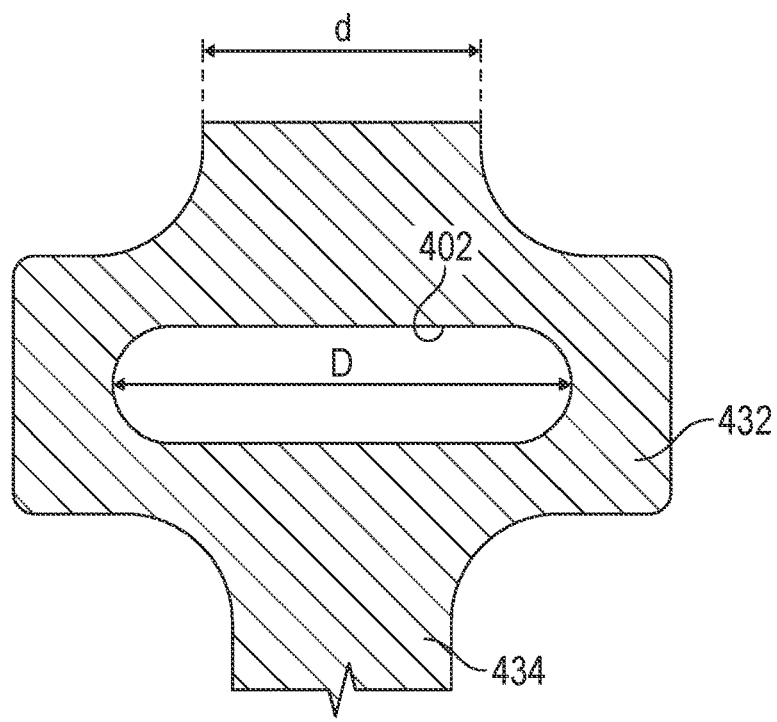
FIG. 23 shows an internal cavity that has a larger diameter than the mounting face to provide a "drum effect" when excited by the generator.

FIG. 23 depicts an internal cavity 402 that has a larger diameter D than the diameter d of the mounting face to provide a "drum effect" when excited by the generator.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A sonotrode comprising:
multiple layers of a material melted to one another to form a structure, the structure providing a base having an attachment feature configured to operatively secure to an ultrasonic converter, the structure includes a shaft extending from the base to a terminal end providing a working surface configured to selectively engage a workpiece; and
wherein the structure has at least one shaft that includes a first shaft extending from the base to a first terminal end providing a first working surface configured to selectively engage a workpiece, the first shaft is integrally formed with the base from the multiple layers to provide an unbroken, monolithic construction.

2. The sonotrode of claim 1, wherein the structure includes an outer surface that is provided by a substantially unmachined surface.

3. The sonotrode of claim 2, wherein the unmachined surface is at least 50% of an area of the outer surface.

4. The sonotrode of claim 3, wherein the shaft and base are interconnected by an integral fillet, and the fillet is provided by the unmachined surface.

5. The sonotrode of claim 1, wherein the base and the first shaft is constructed of the same material.

6. The sonotrode of claim 1, wherein an internal cavity is substantially enclosed by the multiple layers and arranged interiorly of an exterior surface of the structure.

7. The sonotrode of claim 6, a cooling passage is provided within the structure and formed in situ within the multiple layers.

8. The sonotrode of claim 7, wherein the cooling passage includes multiple passageways intersecting one another at non-perpendicular junctions.

9. The sonotrode of claim 8, wherein the cooling passage is curved and provides an extrados and an intrados at one of the non-perpendicular junctions.

10. The sonotrode of claim 1, wherein the structure has a density that varies across at least portions of the multiple layers by greater than 0.1%.

11. The sonotrode of claim 1, wherein the attachment feature is one of a stud and a threaded hole, the attachment feature having an unmachined external surface formed by the multiple layers.

12. The sonotrode of claim 1, wherein the structure extends in a longitudinal direction from the base to the working surface, the attachment feature provided at a mounting face of the base, the mounting face having a first central point, and the working surface having a second central point, the first and second central points offset relative to one another with respect to the longitudinal direction.

13. The sonotrode of claim 1, wherein the structure includes an outer surface, and the structure has a fluid attachment provided at the outer surface by the multiple layers, the fluid attachment in fluid communication with an internal fluid passage.

14. The sonotrode of claim 13, wherein the fluid attachment is a barb configured to connect to a fluid line.

15. The sonotrode of claim 7, wherein the cooling passage includes a venturi having first and second tapered portions joined at a throat.

16. The sonotrode of claim 15, wherein the venturi impinges upon a protrusion at a junction between outlet portions of the cooling passage, the outlet portions provided in the neck near the terminal end.

17. The sonotrode of claim 7, wherein the cooling passage includes an annular passage fluidly connected to multiple secondary passages.

* * * * *